United States Patent [19]
Koehler et al.

[11] Patent Number: 5,445,429
[45] Date of Patent: Aug. 29, 1995

[54] CONVERTIBLE WIND PROTECTION DEVICE

[75] Inventors: Harald Koehler, Ditzingen; Dieter Raisch, Rutesheim; Bodo Homann, Heimsheim, all of Germany

[73] Assignee: Dr. Ing. h.c.F. Porsche AG, Germany

[21] Appl. No.: 222,271

[22] Filed: Apr. 4, 1994

[30] Foreign Application Priority Data

Apr. 2, 1993 [DE] Germany .................. 43 10 881.4

[51] Int. Cl.⁶ .............................................. B60J 7/22
[52] U.S. Cl. ...................................... 296/107; 296/85; 296/180.1; 296/180.5
[58] Field of Search ................ 296/85, 180.1, 180.5, 296/107

[56] References Cited

U.S. PATENT DOCUMENTS

| | | | |
|---|---|---|---|
| 1,592,168 | 7/1926 | Weidman | 296/85 |
| 1,673,798 | 6/1928 | Carlson | 296/85 |
| 5,219,201 | 6/1993 | Gotz et al. | 296/85 X |

FOREIGN PATENT DOCUMENTS

| | | |
|---|---|---|
| 0394676 | 10/1990 | European Pat. Off. . |
| 0398027 | 11/1990 | European Pat. Off. . |
| 29449 | 7/1925 | France ................ 296/85 |
| 1797558 | 10/1959 | Germany . |
| 3935630 | 5/1991 | Germany . |
| 3506 | of 1914 | United Kingdom ........ 296/85 |

Primary Examiner—Dennis H. Pedder
Attorney, Agent, or Firm—Evenson, McKeown, Edwards & Lenahan

[57] ABSTRACT

A convertible wind protection device which is arranged behind a row of seats projects upward over the row of seats and extends along the entire width of the vehicle interior. The wind protection device can be displaced from an inoperative into an operative position. In order to provide a wind protection device with easy operability and in a space-saving housing in its inoperative position when the top is closed, it is provided that the swivellable wind protection device is disposed on the folding top of the convertible.

20 Claims, 5 Drawing Sheets

CONVERTIBLE WIND PROTECTION DEVICE

BACKGROUND AND SUMMARY OF THE INVENTION

The present invention relates to a convertible wind protection device arranged behind a row of seats and extending above this row of seats, preferably along the whole width of the interior, and displaceable from an inoperative into an operative position.

In a known arrangement shown German Patent DE-GM 1,797,558, a wind protection device is provided behind the front seats of a convertible and is formed by a plexiglass pane which is divided in the center. The plexiglass pane is held in position by a frame ledge which is swivellably connected with a lateral wall of the vehicle body. When not in use, however this wind partition requires additional storage space in the trunk or in the passenger compartment. Moreover, the operating and mounting of the wind partition is unwieldly.

It is an object of the present invention to a wind protection device on a convertible such that the wind protection device is easy to operate and, in its inoperative position when the folding top is closed, can be housed in a space-saving manner.

According to an embodiment of the present invention, this object has been achieved by providing a swivellable wind protection device in a convertible folding top.

Among the principal advantages achieved by virtue of the present invention are that, as a result of a swivellable bearing of the wind protection device provided on the folding top, a simple operation and a space-saving housing of the wind protection device are achieved. In addition, the wind protection device can always remain mounted and, when not in operation, does not have to be removed and stored in the trunk.

The wind protection device of the present invention can be manufactured in a simple manner and can easily be mounted on the vehicle top. The provided locking devices have the effect that the wind protection device remains in the intended positions in the inoperative as well as in the operative position. The provision of an additional, approximately horizontal cover behind the wind protection device, the effect the wind protection device is optimized.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
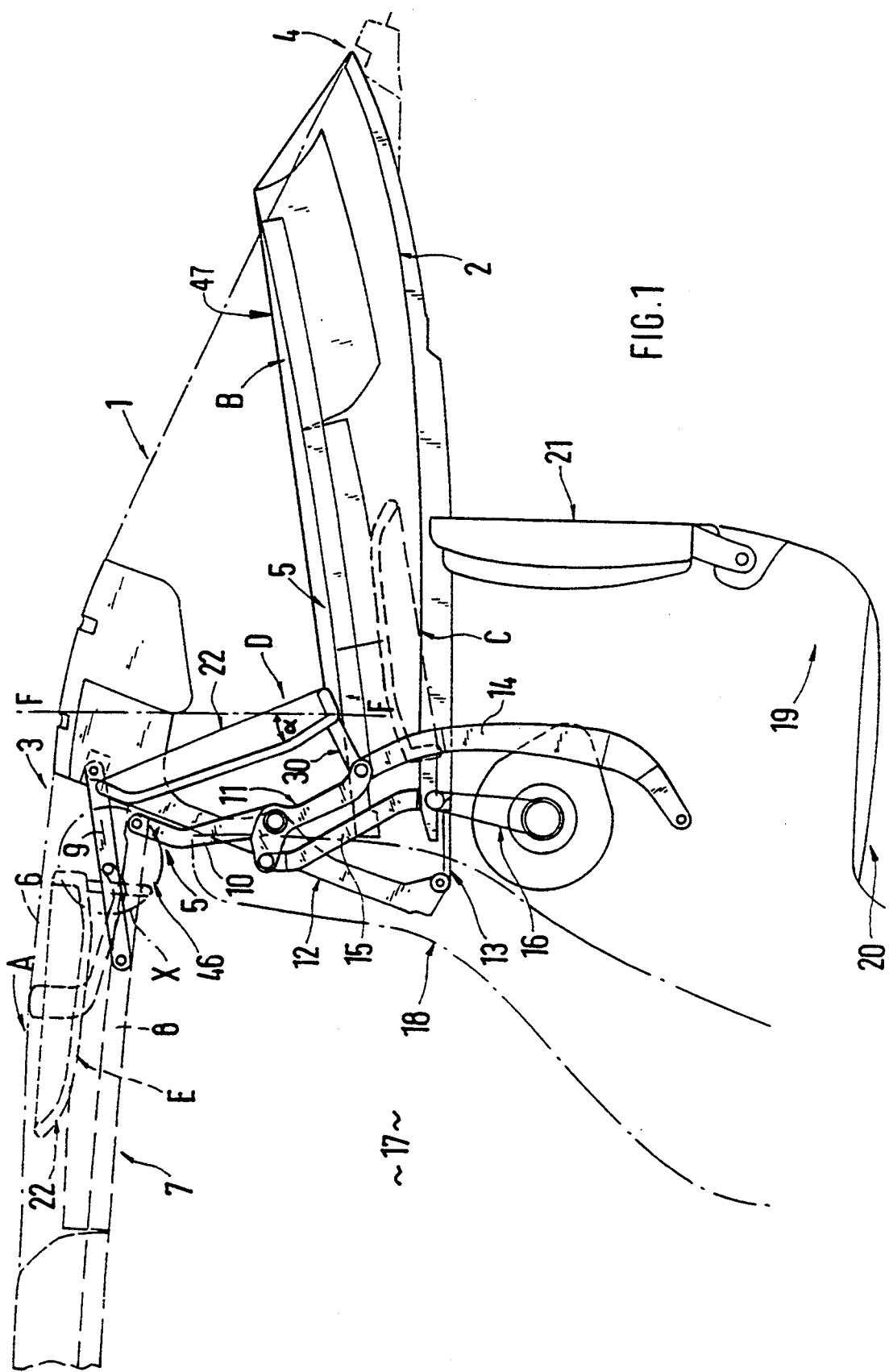
FIG. 1 is a partial lateral view of a convertible top and a wind protection device in accordance with the present invention.

Above a belt line 2, the convertible 1 illustrated in FIG. 1 comprises a folding top 3 which can be moved from a closed position A toward the rear into a folded-back open position B and vice versa. In the open position B, the top 3 is situated slightly above the belt line 2 in the rearward area 4. In the closed position A, the top 3 extends from a conventional windshield frame (not shown) in known manner, to the rearward area 4. The top 3 comprises a folding top linkage 5 and a top cover 6. In the illustrated area of the top 3, the folding top linkage 5 includes a roof frame 7 which is formed by lateral frame rails 8 and a transversely extending support (not shown) extending adjacent to the upper windshield frame.

The frame rails 8 which are constructed in one piece, are connected on one side via a roof frame control arm 9 and, on the other side, via a lever arm 10 of an angle lever 11 in an articulated manner with a main top column 12. The main top column 12 is swivellably disposed on both longitudinal sides of the vehicle. Each column 12 is swivellable on a top bearing 13 provided at the level of the belt line 2. The folding top linkage 5 also comprises control arms 14, 15 which interact with the angle lever 11 and a driving device 16.

In a passenger compartment 17 of the convertible, front seats 18 and a rear seat unit 19 are provided, in which case only the backrest is shown of the front seats 18. The rear seat unit 19 comprises a seat part 20 and a swivellable backrest 21.

A wind protection device 22 is arranged so that, when the top 3 is open, the occupants situated in the front seats 18 are protected during the drive from an undesirable draft which acts upon them from the rearward direction.

According to the present invention, the swivellable wind protection device 22 is disposed on the folding top linkage 5 of the top 3. When the top 3 is closed, the wind protection device 22 extends at a short distance from the cover 6 of the top 3 situated thereabove it, in which case the wind protection device 22 is aligned approximately in parallel to the top cover 6 (position E in FIG. 1). When the top 3 is folded back (open position B), the wind protection device 22 can be moved from an inoperative position C extending adjacent to the belt line 2 upwards into an upright operative position D and vice versa.

Figure 2:
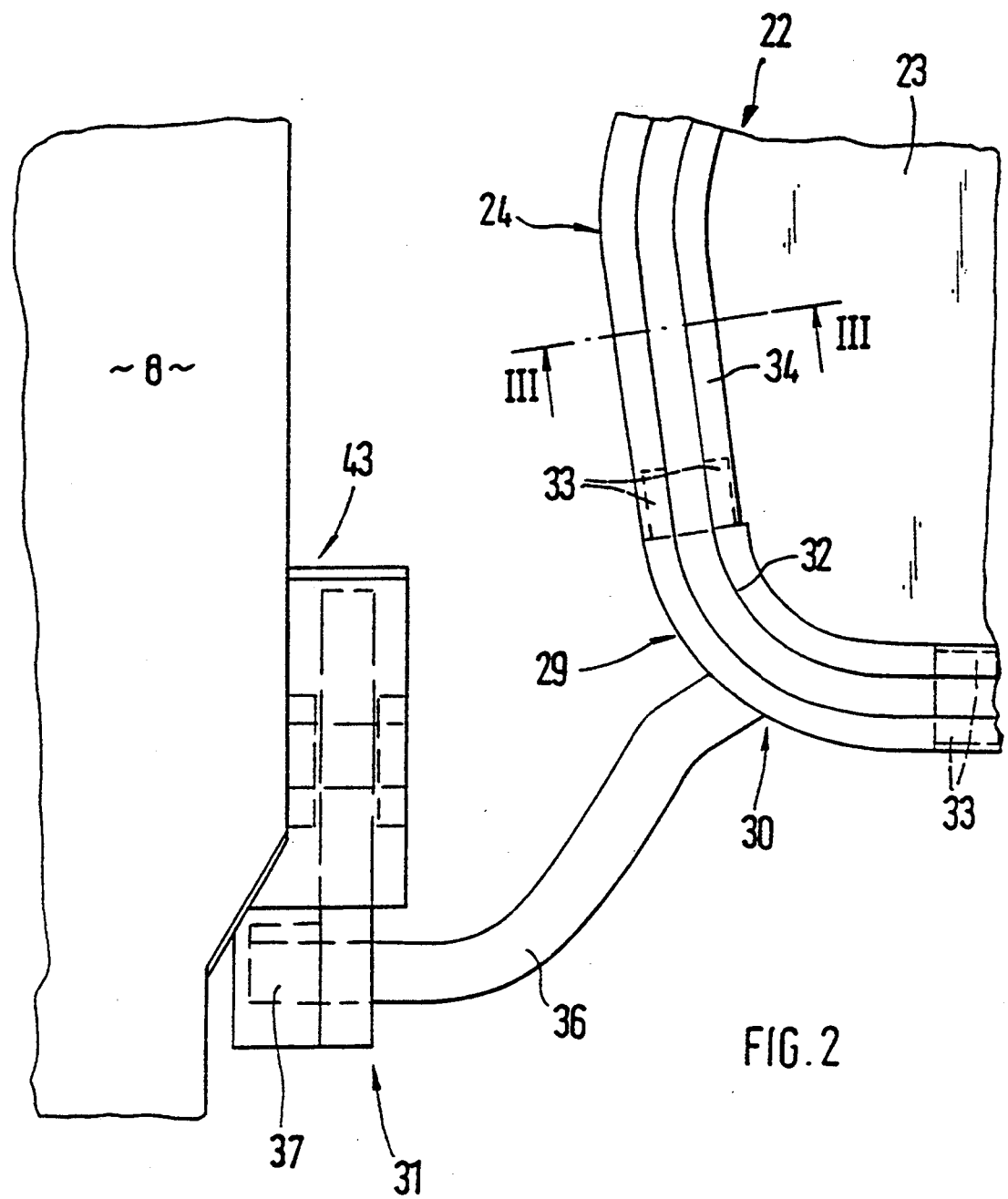
FIG. 2 is an enlarged partial view from the rear of the wind protection device of FIG. 1 and the bearing element with the locking device.

In one embodiment, the wind protection device 22 is formed by a frame 24 provided with a covering 23 (FIG. 2). The covering 23 completely covers the surface surrounded by the frame 24 and may be formed by an elastically deformable net, a transparent foil, a sheet made of plastic material, a glass pane or a polyglass pane or the like. In the operative position D and viewed from the rear, the frame 24 has an approximately rectangular, trapezoid, oval or similar shape. Viewed in the cross-section, the frame 24 may be formed by a tube or another profile.

Figure 3:
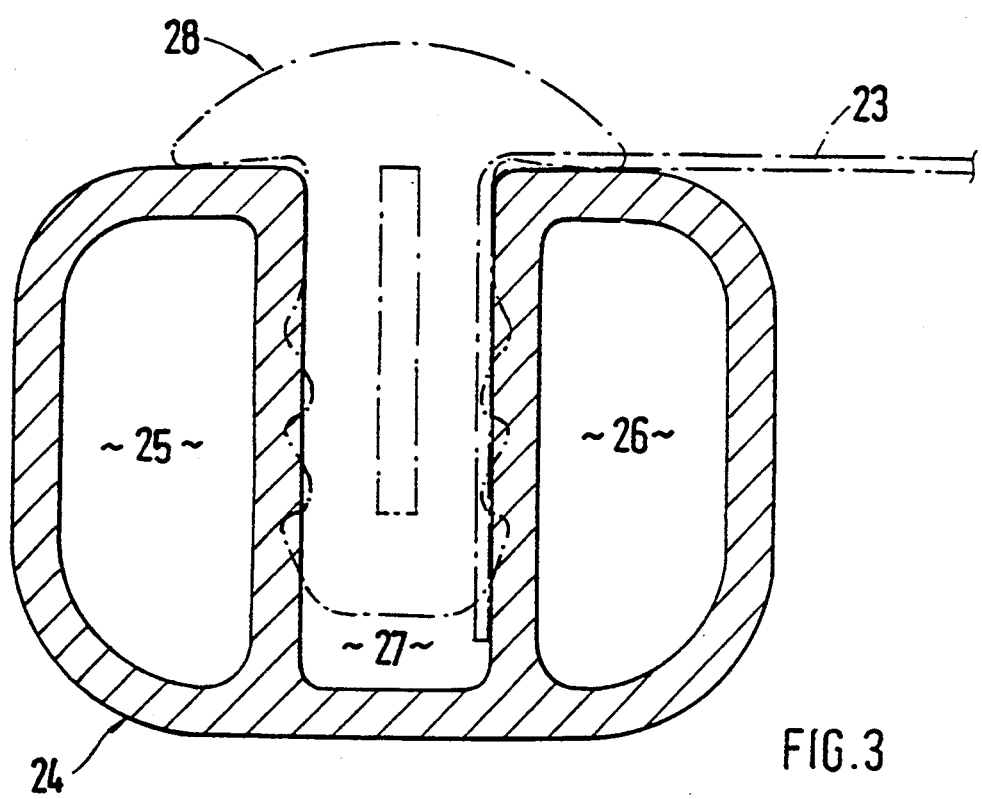
FIG. 3 is an enlarged sectional view according to Line III—III of FIG. 2.
Figure 4:
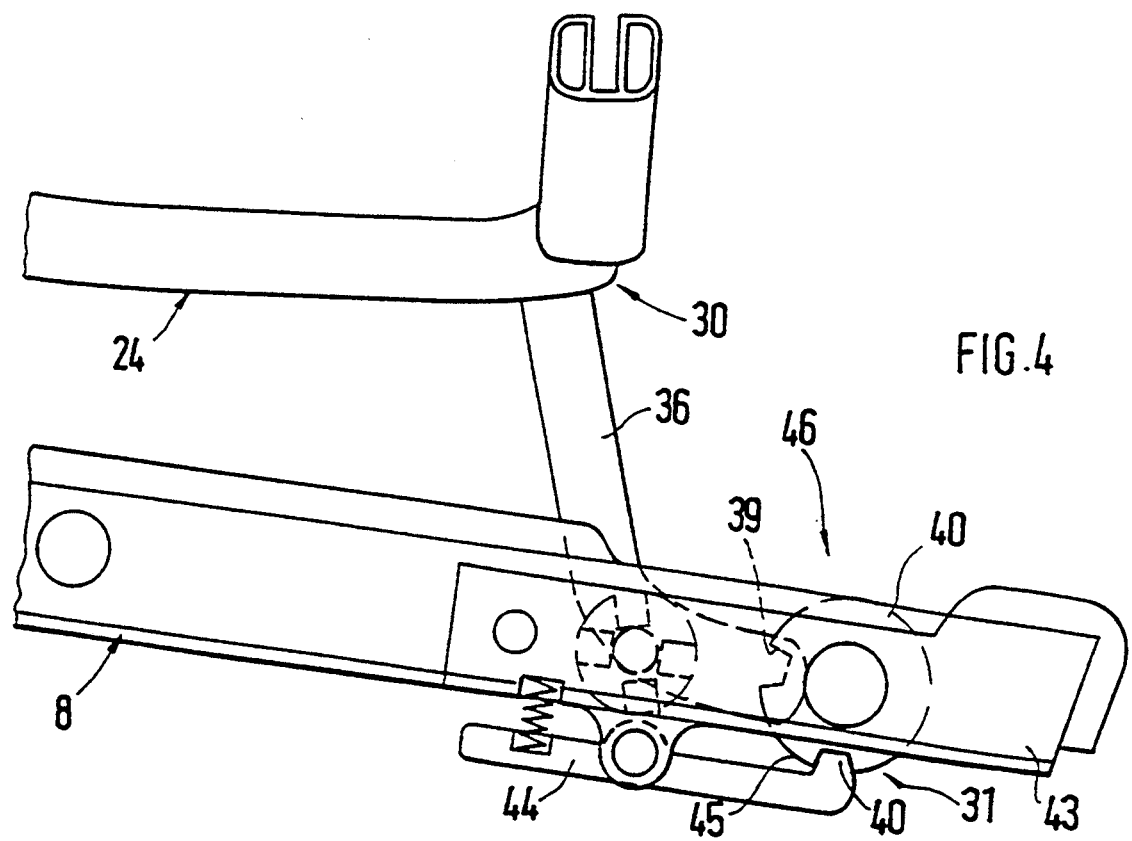
FIG. 4 is an enlarged detail of the circular area designated in dot-dash line by letter X in FIG. 1.
Figure 5:
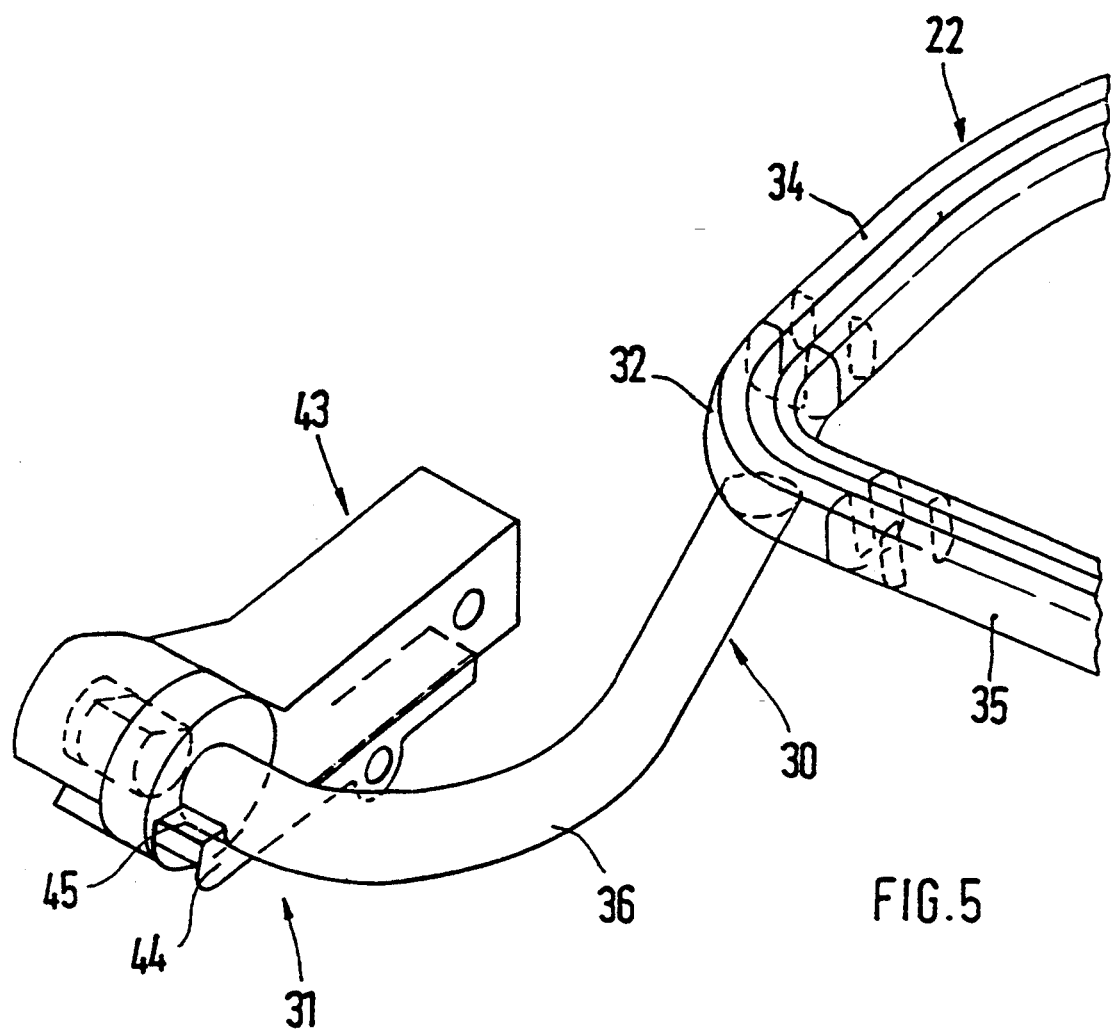
FIG. 5 is a perspective view from the rear of the bearing element and the locking device of the wind protection device of FIG. 1.

In FIGS. 2 and 3, the frame 24, as viewed in the cross-section, has two hollow profile sections 25, 26 which are arranged at a distance from one another, with an approximately U-shaped receiving section 27 extending between them. An elastic weatherstrip 28 for fastening the covering 23 is inserted into this receiving section 27. In addition, the covering 23 may be glued in sections to the frame 24, preferably in the area of the receiving section 27.

In the operative position D, the wind protection device 22 extends beyond the backrest of the seats 18 in the upward direction and extends preferably along the entire interior width of the passenger compartment 17. In addition, the wind protection device 22 is slightly sloped toward the front (angle α) with respect to a perpendicular auxiliary plane F—F.

At the opposite lower corner areas 29 of the frame 24, bearing elements 30 are provided which are preferably formed by plastic injection-molded parts. Each bearing element 30 comprises an integrated locking device 31 so that the wind protection device 22 can be fixed in the inoperative position C as well as in the operative position D.

According to FIG. 2, each bearing element 30 comprises a first curved section 32 which has projecting pins 33 on its two ends. The pins 33 are adapted to the shape of the hollow-profile sections 25, 26 of the frame parts 34, 35 and, when the wind protection device is mounted, project in sections into the hollow-profile sections 25, 26, i.e. plug-type connection. The curved section 32 forms a rounded corner area of the frame 24. The first section 32 of the bearing element 30 is followed by a bent section 36. The free end 37 of the second section 36 is bent approximately at a right angle with respect to the adjoining frame rails 8 and .interacts with the locking device 31.

Figure 6:
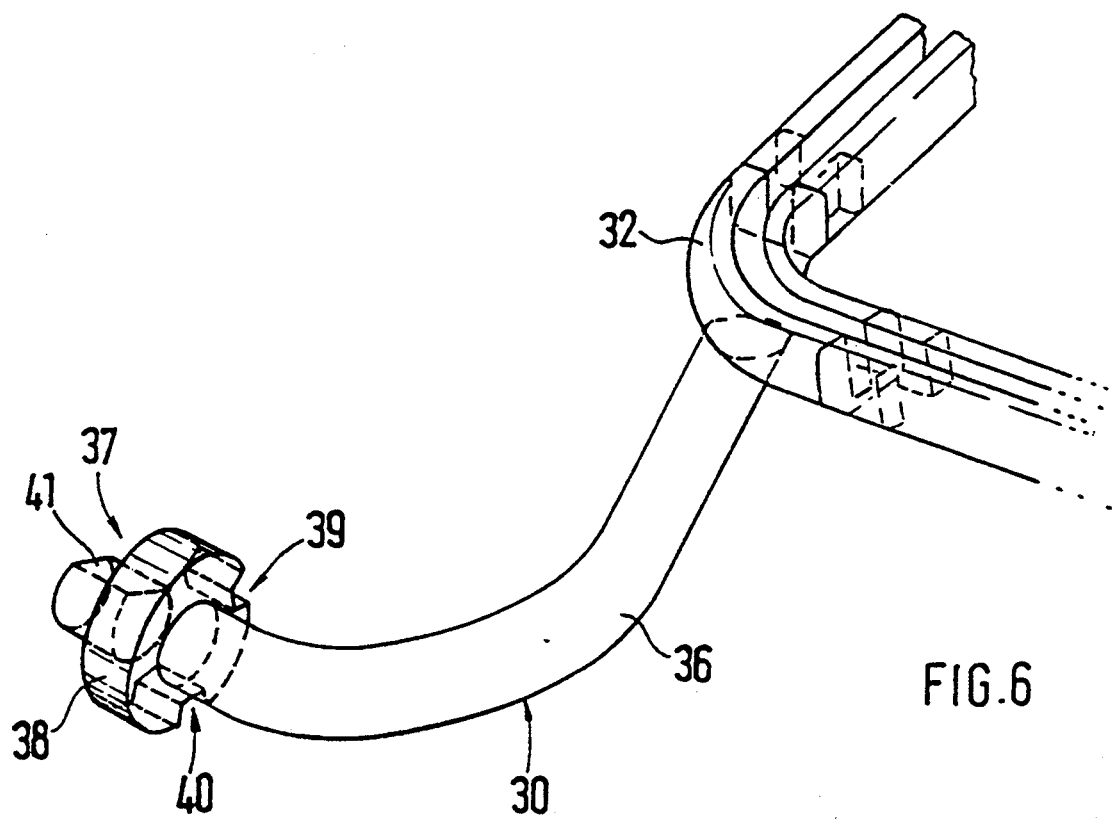
FIG. 6 is a perspective view of the bearing element with the locking device.

As seen in FIG. 6, the locking device 31 comprises a collar 38 which extends at a distance to the free end 37 and which diametrically projects above the tube-shaped section 36. Two recessed locking pieces 39, 40 on this collar 38 are spaced from one another and determine the two end positions of the Wind protection device 22.

Figure 7:
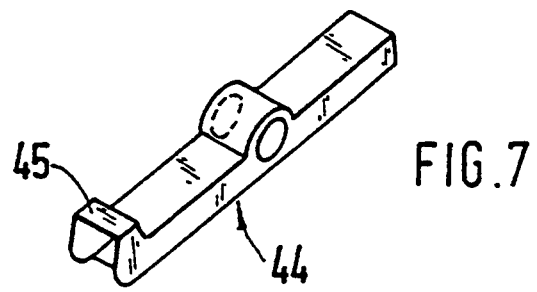
FIG. 7 is a perspective view of the rocker.
Figure 8:
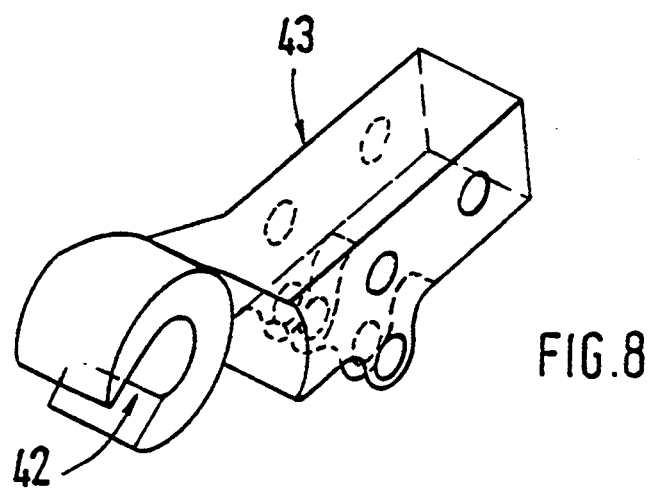
FIG. 8 is a perspective view of the opposed bearing.

A pin-shaped end area 41 of section 36 of the bearing element 30 is flattened on one side and projects into a slotted receiving device 42 (FIG. 8) of an opposed bearing 43 of the locking device 31. On the opposed bearing 43, which is fastened on frame rail 8 by screws, a spring-loaded rocker 44 (FIG. 7) is also swivellably disposed and has a bent-away end-side tongue 45 projecting into one of the locking pieces 39, 40 depending on the position of the wind protection device 22. The fastening of the wind protection device 22 On the frame rail 8 takes place in a rear end area 46 of the frame rail 8 viewed in the closed position A of the top 3.

For optimizing the protection against draft phenomena, when the top B is folded back and the wind protection device 22 is upright, the vehicle body area or top area situated behind the wind protection device 22 may be closed off by a cover 47 so that the air cannot flow through under the wind protection device 22 toward the front to the occupants of the front seats 18. This preferably elastic cover may be formed by a canvas, a blind or the like. The wind protection device 22 can also constitute a frameless transparent sheet-shaped element which is fastened on its two longitudinal sides on the folding top 3 by bearing elements.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A convertible wind protection device arranged behind a row of Seats so as to extend upwardly beyond the row along a transverse width of an interior of a convertible and configured and arranged to be swivellable from an inoperative position into an upright operative position, wherein a lower portion of the wind protection device is articulated on a folding top of the convertible such that, in an open position of the folding top with the interior of the convertible top exposed to the surrounding environment, the wind protection device is movable into the operative position and vehicle occupants are protected from drafts moving from the rear of the convertible toward the front of the convertible.

2. The device according to claim 1, wherein, when the top is in a closed position, the wind protection device extends below a top cover of the folding top and is aligned approximately parallel to the top cover.

3. The device according to claim 1, wherein, in the open position of the top, the wind protection device is movable from the inoperative position extending adjacent to a belt line of the convertible upwards into the operative position.

4. The device according to claim 1, wherein the wind protection device comprises a profiled frame having a covering comprising one of an elastically deformable net and a transparent element.

5. The device according to claim 1, wherein the wind protection device comprises a profiled frame having a covering comprising a transparent element formed from one of a foil, a sheet and a pane.

6. The device according to claim 4, wherein the frame has one of an approximately rectangular, trapezoid, and oval shape.

7. The device according to claim 5, wherein the frame has one of an approximately rectangular, trapezoid, and oval shape.

8. The device according to claim 4, wherein bearing elements are provided on opposite lower corners of the frame, and locking devices are integrated into the bearing elements such that the wind protection device is configured to be fixed in the inoperative position and in the operative position.

9. The device according to claim 8, wherein the wind protection device is swivellably disposed on lateral frame rails of a linkage of the folding top.

10. The device according to claim 9, wherein, when the top is in the closed position, the bearing elements and the integrated locking devices, are arranged adjacent to a rearward end area of the lateral frame rails of the folding top linkage.

11. The device according to claim 8, wherein each of the bearing element Comprises a first curved section with end-side projecting pins insertable into adjoining hollow-profile sections of the frame, and a second bent section is connected to the first section, with the locking device being arranged at a free end of the second section.

12. The device according to claim 11, wherein the locking devices comprise a collar arranged on the second section of the bearing element, recessed locking pieces and provided on the collar so as to interact with a spring-loaded rocker arranged on an opposed bearing.

13. The device according to claim 12, wherein the wind protection device is swivellably disposed on lateral frame rails of a linkage of the folding top.

14. The device according to claim 13, wherein, when the top is in the closed position, the bearing elements and the integrated locking devices, are arranged adjacent to a rearward end area of the lateral frame rails of the folding top linkage.

15. The device according to claim 1, wherein, when the top is folded back and in the open position with the wind protection device in the operative position, an area of one of the top and vehicle body situated behind the wind protection device is closed by a cover.

16. A convertible vehicle with a folding top, comprising a wind protection device arranged behind a row of seats of the vehicle so as to extend upwardly beyond the row along a transverse width of an interior of the vehicle, and configured and arranged to be swivellable from an inoperative position into an upright operative position, wherein a lower portion of the wind protection device is articulated on on the folding top such that, in an open position of the folding top with the interior of the convertible top exposed to the surrounding environment, the wind protection device is movable into the operative position and vehicle occupants are protected from drafts moving from the rear of the convertible toward the front of the convertible.

17. The device according to claim 16, wherein, when the top is in a closed position, the wind protection device extends below a top cover of the folding top and is aligned approximately parallel to the top cover.

18. The device according to claim 16 wherein, in the open position of the top, the wind protection device is movable from the inoperative position extending adjacent to a belt line of the convertible upwards into the operative position.

19. The device according to claim 16, wherein the wind protection device comprises a profiled frame having a covering comprising one of an elastically deformable net and a transparent element.

20. The device according to claim 16, wherein, when the top is folded back and in the open position with the wind protection device in the operative position, an area of one of the top and vehicle body situated behind the wind protection device is closed by a cover.

* * * * *